United States Patent
Sato (10) Patent No.: US 7,532,415 B2
(45) Date of Patent: May 12, 2009

(54) IMAGING LENS

(75) Inventor: Kenichi Sato, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 57 days.

(21) Appl. No.: 11/896,626

(22) Filed: Sep. 4, 2007

(65) Prior Publication Data

US 2008/0055742 A1    Mar. 6, 2008

(30) Foreign Application Priority Data

Sep. 5, 2006   (JP) .......................... P 2006-239808

(51) Int. Cl.
*G02B 9/34* (2006.01)
(52) U.S. Cl. ......................... 359/779; 359/771; 359/772
(58) Field of Classification Search ................. 359/758, 359/769, 771, 772, 779
See application file for complete search history.

(56) References Cited

U.S. PATENT DOCUMENTS

| | | | | |
|---|---|---|---|---|
| 7,012,765 B2* | 3/2006 | Matsui et al. | ................ | 359/771 |
| 7,061,694 B2* | 6/2006 | Amanai | ....................... | 359/773 |
| 7,295,386 B2* | 11/2007 | Taniyama | .................... | 359/772 |
| 7,345,830 B2* | 3/2008 | Shinohara | .................... | 359/772 |
| 7,403,344 B2* | 7/2008 | Xu et al. | ...................... | 359/779 |
| 7,443,611 B2* | 10/2008 | Shinohara | .................... | 359/772 |

FOREIGN PATENT DOCUMENTS

JP      2000-180719 A      6/2000

* cited by examiner

*Primary Examiner*—David N Spector
(74) *Attorney, Agent, or Firm*—Birch, Stewart, Kolasch & Birch, LLP (57) ABSTRACT

An imaging lens is provided and includes: in order from an object side of the imaging lens, a first lens having a positive refractive power; a second lens having a positive refractive power and being a spherical glass lens having a convex surface on an image side thereof; a third lens having a negative refractive power and having a concave surface on the object side in the vicinity of an optical axis thereof; and a fourth lens having a positive refractive power and having a meniscus shape in the vicinity of the optical axis thereof, a convex surface in the meniscus shape being directed to the object side, the imaging lens satisfying a specific condition.

16 Claims, 11 Drawing Sheets

EXAMPLE 5

FIG. 6A

| | EXAMPLE 1: BASIC LENS DATA | | | | |
|---|---|---|---|---|---|
| | Si (SURFACE NUMBER) | Ri (RADIUS OF CURVATURE) | Di (SURFACE SEPARATION) | Ndj (REFRACTIVE INDEX) | $\nu dj$ (ABBE NUMBER) |
| G1 | 1 | 2.816 | 0.50 | 1.531 | 55.4 |
| G1 | 2 | 42.299 | 0.50 | | |
| G2 | 3 | 6.234 | 0.60 | 1.487 | 70.4 |
| G2 | 4 | -10.106 | 0.80 | | |
| G3 | 5 | -2.190 | 0.40 | 1.531 | 55.4 |
| G3 | 6 | 3.671 | 0.08 | | |
| G4 | 7 | 1.059 | 0.88 | 1.531 | 55.4 |
| G4 | 8 | 1.600 | 1.13 | | |
| GC | 9 | ∞ | 0.30 | 1.516 | 64.1 |
| GC | 10 | ∞ | 0.00 | | |

(f=4.46, FNo.=3.5, 2ω=64.2°)

FIG. 6B

| | EXAMPLE 1: ASPHERICAL SURFACE DATA | | |
|---|---|---|---|
| ASPHERICAL COEFFICIENT | SURFACE NUMBER | | |
| | FIRST SURFACE | SECOND SURFACE | FIFTH SURFACE |
| K | 9.627E+00 | 1.000E+00 | 3.349E+00 |
| A3 | -2.898E-02 | -2.073E-03 | 3.457E-02 |
| A4 | 2.004E-02 | -1.162E-01 | 3.333E-02 |
| A5 | -4.313E-01 | 1.413E-01 | 5.938E-02 |
| A6 | 6.767E-01 | -3.148E-01 | -1.159E-01 |
| A7 | -3.373E-01 | 1.776E-01 | -1.881E-02 |
| A8 | -5.827E-01 | 1.693E-01 | 3.291E-02 |
| A9 | 5.881E-01 | -1.331E-01 | 2.569E-02 |
| A10 | -1.946E-01 | -1.480E-01 | -1.960E-02 |
| | SIXTH SURFACE | SEVENTH SURFACE | EIGHTH SURFACE |
| K | 5.388E+00 | -1.327E-01 | -5.279E+00 |
| A3 | -3.667E-01 | -3.202E-01 | 1.347E-01 |
| A4 | 2.425E-01 | -6.474E-04 | -2.250E-01 |
| A5 | -2.125E-02 | 4.090E-02 | 1.037E-01 |
| A6 | -4.709E-02 | 1.383E-02 | -5.728E-03 |
| A7 | -1.917E-02 | -3.612E-03 | -7.256E-03 |
| A8 | 1.851E-02 | -3.659E-03 | 1.014E-04 |
| A9 | 1.593E-02 | 8.651E-05 | 8.861E-04 |
| A10 | -1.137E-02 | 2.670E-04 | -1.700E-04 |

FIG. 7A

| EXAMPLE 2: BASIC LENS DATA ||||||
|---|---|---|---|---|---|
| | Si (SURFACE NUMBER) | Ri (RADIUS OF CURVATURE) | Di (SURFACE SEPARATION) | Ndj (REFRACTIVE INDEX) | νdj (ABBE NUMBER) |
| G1 | 1 | 2.874 | 0.50 | 1.531 | 55.4 |
| | 2 | 20.000 | 0.50 | | |
| G2 | 3 | 7.038 | 0.60 | 1.487 | 70.4 |
| | 4 | -5.571 | 0.80 | | |
| G3 | 5 | -2.190 | 0.40 | 1.531 | 55.4 |
| | 6 | 3.745 | 0.08 | | |
| G4 | 7 | 1.087 | 0.88 | 1.531 | 55.4 |
| | 8 | 1.555 | 1.19 | | |
| GC | 9 | ∞ | 0.30 | 1.516 | 64.1 |
| | 10 | ∞ | 0.00 | | |

(f=4.52, FNo.=3.5, 2ω=63.0°)

FIG. 7B

| EXAMPLE 2: ASPHERICAL SURFACE DATA ||||
|---|---|---|---|
| ASPHERICAL COEFFICIENT | SURFACE NUMBER |||
| | FIRST SURFACE | SECOND SURFACE | FIFTH SURFACE |
| K | 1.008E+01 | 1.000E+00 | 3.349E+00 |
| A3 | -2.816E-02 | -3.594E-03 | 3.457E-02 |
| A4 | 2.097E-02 | -1.085E-01 | 3.333E-02 |
| A5 | -4.337E-01 | 1.412E-01 | 5.938E-02 |
| A6 | 6.719E-01 | -3.264E-01 | -1.159E-01 |
| A7 | -3.364E-01 | 1.643E-01 | -1.881E-02 |
| A8 | -5.754E-01 | 1.711E-01 | 3.291E-02 |
| A9 | 5.919E-01 | -1.080E-01 | 2.569E-02 |
| A10 | -2.016E-01 | -1.426E-01 | -1.960E-02 |
| | SIXTH SURFACE | SEVENTH SURFACE | EIGHTH SURFACE |
| K | 5.528E+00 | -1.762E-01 | -5.279E+00 |
| A3 | -3.745E-01 | -3.279E-01 | 1.322E-01 |
| A4 | 2.477E-01 | -8.757E-04 | -2.240E-01 |
| A5 | -2.293E-02 | 4.322E-02 | 1.043E-01 |
| A6 | -4.882E-02 | 1.464E-02 | -5.728E-03 |
| A7 | -2.005E-02 | -3.617E-03 | -7.256E-03 |
| A8 | 1.825E-02 | -3.847E-03 | 1.014E-04 |
| A9 | 1.603E-02 | -3.027E-05 | 8.861E-04 |
| A10 | -1.109E-02 | 2.689E-04 | -1.700E-04 |

FIG. 8A

| | EXAMPLE 3: BASIC LENS DATA | | | | |
|---|---|---|---|---|---|
| | Si (SURFACE NUMBER) | Ri (RADIUS OF CURVATURE) | Di (SURFACE SEPARATION) | Ndj (REFRACTIVE INDEX) | νdj (ABBE NUMBER) |
| | 0 (STOP) | — | 0.30 | | |
| G1 | 1 | 2.625 | 0.50 | 1.492 | 58.1 |
| | 2 | 25.955 | 0.50 | | |
| G2 | 3 | 14.019 | 0.60 | 1.487 | 70.4 |
| | 4 | -4.001 | 0.80 | | |
| G3 | 5 | -2.190 | 0.40 | 1.492 | 58.1 |
| | 6 | 3.845 | 0.08 | | |
| G4 | 7 | 1.117 | 0.85 | 1.492 | 58.1 |
| | 8 | 1.373 | 1.19 | | |
| GC | 9 | ∞ | 0.30 | 1.516 | 64.1 |
| | 10 | ∞ | 0.00 | | |

(f=4.65, FNo.=3.5, 2ω=60.8°)

FIG. 8B

| | EXAMPLE 3: ASPHERICAL SURFACE DATA | | |
|---|---|---|---|
| ASPHERICAL COEFFICIENT | SURFACE NUMBER | | |
| | FIRST SURFACE | SECOND SURFACE | FIFTH SURFACE |
| K | 8.382E+00 | 1.000E+00 | 3.349E+00 |
| A3 | -1.740E-02 | -7.967E-04 | 3.457E-02 |
| A4 | 1.266E-02 | -1.059E-01 | 3.333E-02 |
| A5 | -4.582E-01 | 1.577E-01 | 5.938E-02 |
| A6 | 6.528E-01 | -3.379E-01 | -1.159E-01 |
| A7 | -3.044E-01 | 1.119E-01 | -1.881E-02 |
| A8 | -5.143E-01 | 1.132E-01 | 3.291E-02 |
| A9 | 6.026E-01 | -8.944E-02 | 2.569E-02 |
| A10 | -3.426E-01 | -1.429E-02 | -1.960E-02 |
| | SIXTH SURFACE | SEVENTH SURFACE | EIGHTH SURFACE |
| K | 5.263E+00 | -5.698E-01 | -5.279E+00 |
| A3 | -3.823E-01 | -3.431E-01 | 1.161E-01 |
| A4 | 2.670E-01 | 5.453E-03 | -2.165E-01 |
| A5 | -1.951E-02 | 5.512E-02 | 1.037E-01 |
| A6 | -4.808E-02 | 1.937E-02 | -5.728E-03 |
| A7 | -2.026E-02 | -3.432E-03 | -7.256E-03 |
| A8 | 1.786E-02 | -4.987E-03 | 1.014E-04 |
| A9 | 1.611E-02 | -8.050E-04 | 8.861E-04 |
| A10 | -1.055E-02 | 4.768E-04 | -1.700E-04 |

FIG. 9A

| EXAMPLE 4: BASIC LENS DATA ||||||
|---|---|---|---|---|---|
| | Si (SURFACE NUMBER) | Ri (RADIUS OF CURVATURE) | Di (SURFACE SEPARATION) | Ndj (REFRACTIVE INDEX) | $\nu$dj (ABBE NUMBER) |
| | 0 (STOP) | — | 0.20 | | |
| G1 | 1 | 2.664 | 0.50 | 1.531 | 55.4 |
| | 2 | 6.950 | 0.50 | | |
| G2 | 3 | 6.622 | 0.60 | 1.487 | 70.4 |
| | 4 | -3.491 | 0.80 | | |
| G3 | 5 | -2.190 | 0.40 | 1.531 | 55.4 |
| | 6 | 3.985 | 0.08 | | |
| G4 | 7 | 1.100 | 0.85 | 1.531 | 55.4 |
| | 8 | 1.362 | 1.19 | | |
| GC | 9 | ∞ | 0.30 | 1.516 | 64.1 |
| | 10 | ∞ | 0.00 | | |

(f=4.50, FNo.=3.5, 2$\omega$=64.0°)

FIG. 9B

| EXAMPLE 4: ASPHERICAL SURFACE DATA ||||
|---|---|---|---|
| ASPHERICAL COEFFICIENT | SURFACE NUMBER |||
| | FIRST SURFACE | SECOND SURFACE | FIFTH SURFACE |
| K | 8.513E+00 | 1.000E+00 | 3.349E+00 |
| A3 | -1.826E-02 | -4.601E-04 | 3.457E-02 |
| A4 | 1.518E-02 | -1.089E-01 | 3.333E-02 |
| A5 | -4.576E-01 | 1.587E-01 | 5.938E-02 |
| A6 | 6.525E-01 | -3.346E-01 | -1.159E-01 |
| A7 | -3.033E-01 | 1.217E-01 | -1.881E-02 |
| A8 | -5.088E-01 | 1.294E-01 | 3.291E-02 |
| A9 | 6.171E-01 | -8.027E-02 | 2.569E-02 |
| A10 | -3.182E-01 | -3.535E-02 | -1.960E-02 |
| | SIXTH SURFACE | SEVENTH SURFACE | EIGHTH SURFACE |
| K | 5.209E+00 | -5.160E-01 | -5.279E+00 |
| A3 | -3.859E-01 | -3.449E-01 | 1.181E-01 |
| A4 | 2.639E-01 | 5.574E-03 | -2.172E-01 |
| A5 | -2.096E-02 | 5.492E-02 | 1.044E-01 |
| A6 | -4.858E-02 | 1.916E-02 | -5.728E-03 |
| A7 | -2.039E-02 | -3.553E-03 | -7.256E-03 |
| A8 | 1.783E-02 | -5.022E-03 | 1.014E-04 |
| A9 | 1.609E-02 | -7.871E-04 | 8.861E-04 |
| A10 | -1.057E-02 | 5.177E-04 | -1.700E-04 |

FIG. 10A

| | EXAMPLE 5: BASIC LENS DATA | | | | |
|---|---|---|---|---|---|
| | Si (SURFACE NUMBER) | Ri (RADIUS OF CURVATURE) | Di (SURFACE SEPARATION) | Ndj (REFRACTIVE INDEX) | νdj (ABBE NUMBER) |
| G1 | 1 | 2.866 | 0.50 | 1.531 | 55.4 |
| G1 | 2 | 5.600 | 0.50 | | |
| G2 | 3 | 8.191 | 0.60 | 1.517 | 64.2 |
| G2 | 4 | -2.901 | 0.80 | | |
| G3 | 5 | -3.033 | 0.60 | 1.606 | 27.0 |
| G3 | 6 | 4.783 | 0.08 | | |
| G4 | 7 | 1.103 | 0.85 | 1.531 | 55.4 |
| G4 | 8 | 1.213 | 1.17 | | |
| GC | 9 | ∞ | 0.30 | 1.516 | 64.1 |
| GC | 10 | ∞ | 0.00 | | |

(f=4.41, FNo.=3.5, 2ω=65.2°)

FIG. 10B

| | EXAMPLE 5: ASPHERICAL SURFACE DATA | | |
|---|---|---|---|
| ASPHERICAL COEFFICIENT | SURFACE NUMBER | | |
| | FIRST SURFACE | SECOND SURFACE | FIFTH SURFACE |
| K | 1.085E+01 | 1.000E+00 | 3.349E+00 |
| A3 | -3.490E-02 | 8.570E-03 | 3.457E-02 |
| A4 | 7.776E-02 | -1.294E-01 | 3.333E-02 |
| A5 | -5.020E-01 | 2.110E-01 | 5.938E-02 |
| A6 | 5.978E-01 | -2.818E-01 | -1.159E-01 |
| A7 | -2.698E-01 | 1.212E-01 | -1.881E-02 |
| A8 | -4.092E-01 | -5.170E-02 | 3.291E-02 |
| A9 | 6.969E-01 | -3.130E-02 | 2.569E-02 |
| A10 | -4.996E-01 | 9.370E-02 | -1.960E-02 |
| | SIXTH SURFACE | SEVENTH SURFACE | EIGHTH SURFACE |
| K | 7.936E+00 | -1.828E-01 | -5.279E+00 |
| A3 | -3.818E-01 | -4.311E-01 | 9.420E-02 |
| A4 | 2.621E-01 | 7.996E-03 | -2.005E-01 |
| A5 | -1.180E-02 | 5.196E-02 | 1.000E-01 |
| A6 | -4.407E-02 | 1.516E-02 | -5.728E-03 |
| A7 | -2.619E-02 | -5.372E-03 | -7.256E-03 |
| A8 | 8.779E-03 | -5.694E-03 | 1.014E-04 |
| A9 | 1.264E-02 | -8.410E-04 | 8.861E-04 |
| A10 | -4.747E-03 | 1.245E-03 | -1.700E-04 |

FIG. 11

| | (1) f2/f | (2) f1/f | (3) \|f3/f\| | (4) f4/f | (5) R4A/f | (6) ν2−ν3 |
|---|---|---|---|---|---|---|
| VALUES RELATING TO CONDITIONAL EXPRESSIONS | | | | | | |
| EXAMPLE 1 | 1.79 | 1.27 | 0.566 | 0.845 | 0.237 | 15.00 |
| EXAMPLE 2 | 1.43 | 1.38 | 0.562 | 0.910 | 0.240 | 15.00 |
| EXAMPLE 3 | 1.39 | 1.27 | 0.598 | 1.250 | 0.240 | 12.30 |
| EXAMPLE 4 | 1.06 | 1.74 | 0.578 | 1.125 | 0.244 | 15.00 |
| EXAMPLE 5 | 0.96 | 2.36 | 0.675 | 1.415 | 0.250 | 37.20 |

EXAMPLE 1

FIG. 12A
SPHERICAL ABERRATION

FIG. 12B
ASTIGMATISM

FIG. 12C
DISTORTION

EXAMPLE 2

FIG. 13A
SPHERICAL ABERRATION

FIG. 13B
ASTIGMATISM

FIG. 13C
DISTORTION

EXAMPLE 3

FIG. 14A
SPHERICAL ABERRATION

FIG. 14B
ASTIGMATISM

FIG. 14C
DISTORTION

EXAMPLE 4

EXAMPLE 5

IMAGING LENS

BACKGROUND OF THE INVENTION

1. Field of the Invention

The present invention relates to an imaging lens to be mounted on an imaging apparatus using an imaging device such as a CCD (Charge Coupled Device) or a CMOS (Complementary Metal Oxide Semiconductor), a digital still camera, a camera-equipped portable telephone, or a personal digital assistance (PDA).

2. Description of Related Art

In a recent imaging device such as a CCD or a CMOS, miniaturization and increase of pixels are highly advancing. Therefore, also the body of an imaging apparatus, and lenses mounted thereon are requested to be further miniaturized and have a higher performance. An imaging lens to be mounted on, for example, a camera-equipped portable telephone is often configured by three lenses. In order to cope with an increased pixel number, however, the number of lenses tends to increase. In order to realize miniaturization and high performance by a reduced number of lenses, furthermore, an aspherical surface tends to be frequently used. JP-A-2000-180719 discloses an imaging lens of a four-lens configuration. The imaging lens disclosed in JP-A-2000-180719 includes a front group, an aperture, and a rear group, sequentially from the object side. The rear group consists of a negative lens, a positive lens, and a positive lens, sequentially from the object side. In the rear group, there is at least one aspherical surface.

In such an imaging lens, aspherical plastic lenses are often used in order to reduce the cost. When only plastic lenses are used, however, there may be an issue in temperature characteristics. In a plastic lens, the lens shape is easily changed with a temperature change, and an image plane change and the like readily occur. In this case, the issue in temperature characteristics can be solved by replacing a lens element having a large power with a glass molded lens. When an aspherical lens is configured by a glass molded lens, however, the cost is inevitably largely increased. In the imaging lens disclosed in JP-A-2000-180719, the temperature characteristics and the cost are not sufficiently studied, and also the compactness is not sufficiently considered.

SUMMARY OF THE INVENTION

An object of an illustrative, non-limiting embodiment of the invention is to provide an imaging lens which has excellent temperature characteristics, a reduced size, and high performance while the cost is suppressed.

According to an aspect of the invention, there is provided an imaging lens comprising: in order from an object side of the imaging lens, a first lens having a positive refractive power; a second lens having a positive refractive power and being a spherical glass lens having a convex surface on an image side thereof; a third lens having a negative refractive power and having a concave surface on the object side in the vicinity of an optical axis thereof; and a fourth lens having a positive refractive power and having a meniscus shape in the vicinity of the optical axis thereof, a convex surface in the meniscus shape being directed to the object side, the imaging lens satisfying the following conditional expression:

$$0.8 < f2/f < 2.0 \quad (1)$$

wherein f is a focal length of the whole system (the imaging lens), and f2 is a focal length of the second lens.

In the imaging lens, the lens shape and the refractive power can be adequately set by the lens configuration in which a relatively small number of lenses, i.e., four lenses are used as a whole, and hence miniaturization and high performance can be realized. Furthermore, the second lens is provided with a relatively large power, and configured by a spherical glass lens. Therefore, the temperature characteristics can be advantageously set while suppressing the cost. Particularly, conditional expression (1) is satisfied so that the focal length of the second lens is substantially equal to or similar to that of the whole system. Even when the other lenses are aspherical plastic lenses, therefore, the positive and negative refractive powers of the lenses are cancelled each other, and a performance which is advantageous to the temperature characteristics can be obtained.

In the imaging lens, the following conditional expressions may be satisfied:

$$1.2 < f1/f < 2.5 \quad (2)$$

$$0.45 < |f3/f| < 0.8 \quad (3)$$

$$0.8 < f4/f < 1.5 \quad (4)$$

wherein f is a focal length of the whole system, f1 is a focal length of the first lens, f3 is a focal length of the third lens, and f4 is a focal length of the fourth lens.

According to the configuration, the power balance among the lenses is optimized, and hence miniaturization and high performance can be realized more readily.

In the imaging lens, an object-side surface of the first lens may be an aspherical surface in which a shape in the vicinity of the optical axis is convex directed to the object side and a positive refractive power becomes weaker as advancing toward a periphery of the first lens, and an image-side surface of the first lens may be an aspherical surface in which a shape in the vicinity of the optical axis is concave directed to the image side and a negative refractive power becomes weaker as advancing toward the periphery of the first lens.

According to the configuration, the shape of the first lens is optimized, and it is advantageous to correction of various aberrations.

In the imaging lens of the invention, the third lens may have a bi-concave shape in the vicinity of the optical axis, and the fourth lens may satisfy the following conditional expression:

$$0.20 < R4A/f < 0.35 \quad (5)$$

wherein f is a focal length of the whole system, and R4A is a paraxial radius of curvature of an object-side surface of the fourth lens.

According to the configuration, the shapes of the third and fourth lenses are optimized, and it is advantageous to correction of various aberrations. The back focus which is required for placing a cover glass and the like can be easily ensured.

In the imaging lens of the invention, the imaging lens may satisfy the following conditional expression:

$$12 < v2 - v3 \quad (6)$$

wherein v2 is an Abbe number of the second lens, and v3 is an Abbe number of the third lens.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to exemplary embodiments thereof, the following exemplary embodiments and modifications do not restrict the invention.

According to an exemplary embodiment of the imaging lens, the lens shape and the refractive power can be adequately set by the lens configuration in which a relatively small number of lenses, four lenses, are used as whole, conditional expression (1) is particularly satisfied so that the focal length of the second lens is substantially equal to or similar to that of the whole system, and the second lens is configured by a spherical glass lens. Therefore, it is possible to realize an imaging lens system which is provided with excellent temperature characteristics, a reduced size, and high performance while the cost is suppressed.

Hereinafter, exemplary embodiments of the invention will be described in detail with reference to the accompanying drawings.

Figure 1:
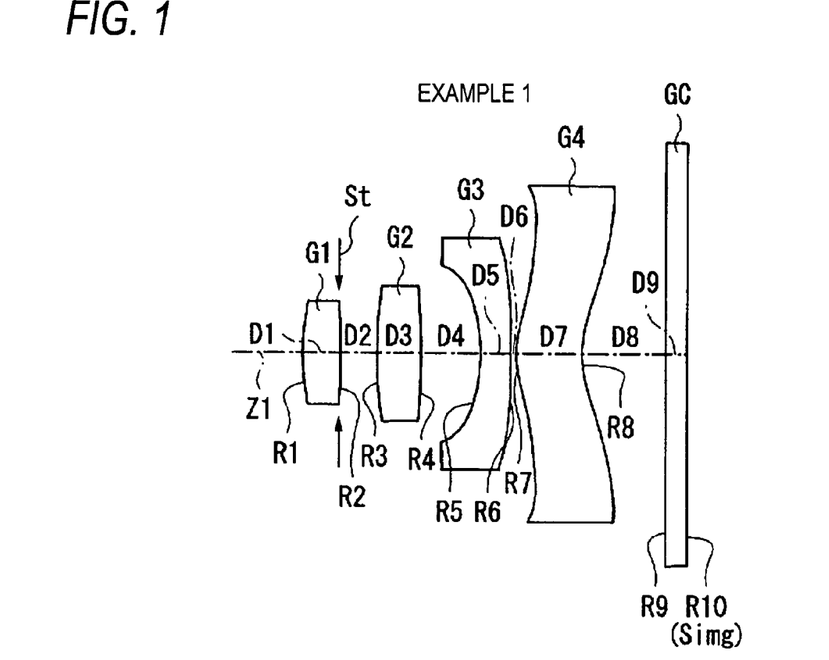
FIG. 1 is a lens section view of an imaging lens of Example 1 according to an exemplary embodiment of the invention.
Figure 2:
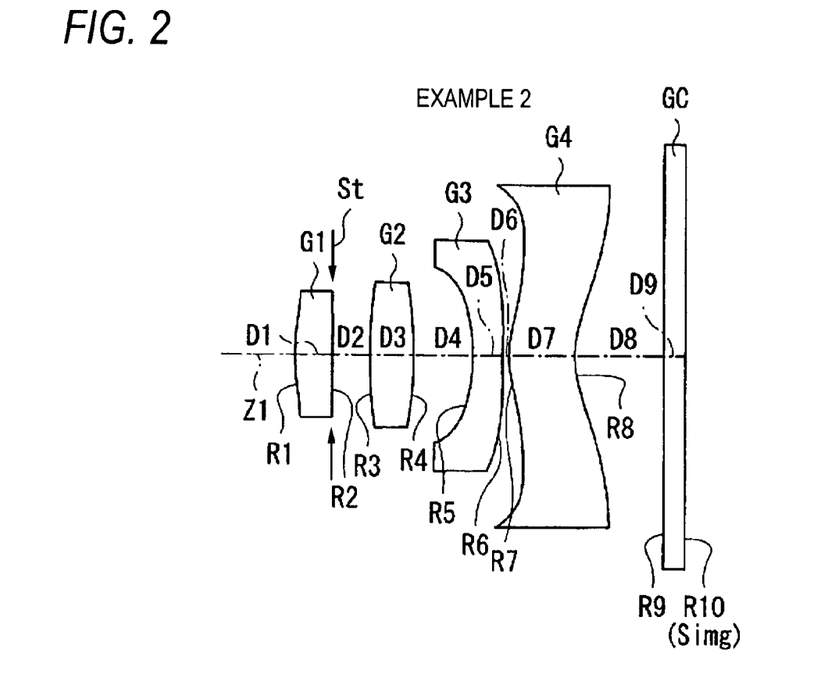
FIG. 2 is a lens section view of an imaging lens of Example 2 according to an exemplary embodiment of the invention.
Figure 3:
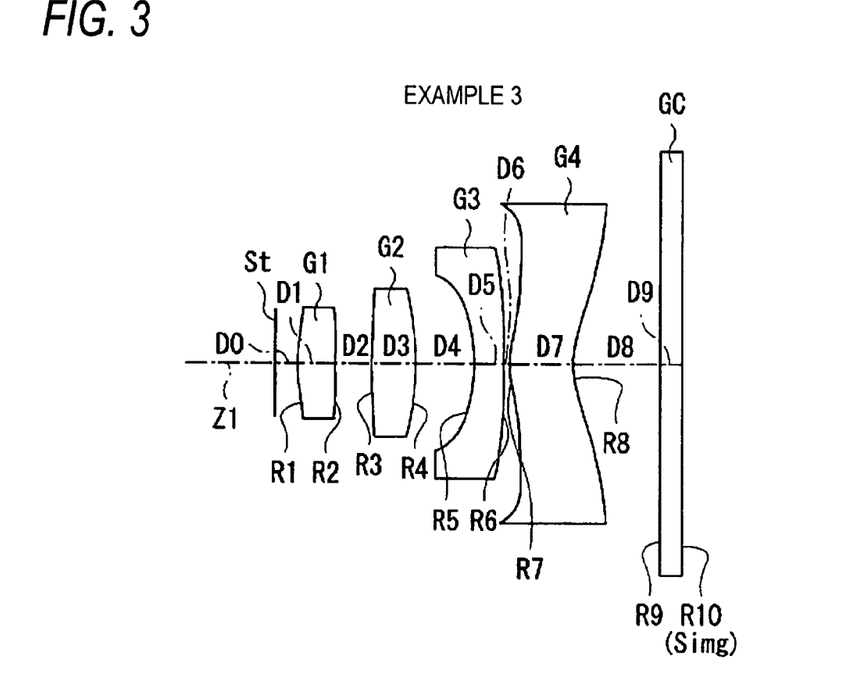
FIG. 3 is a lens section view of an imaging lens of Example 3 according to an exemplary embodiment of the invention.
Figure 4:
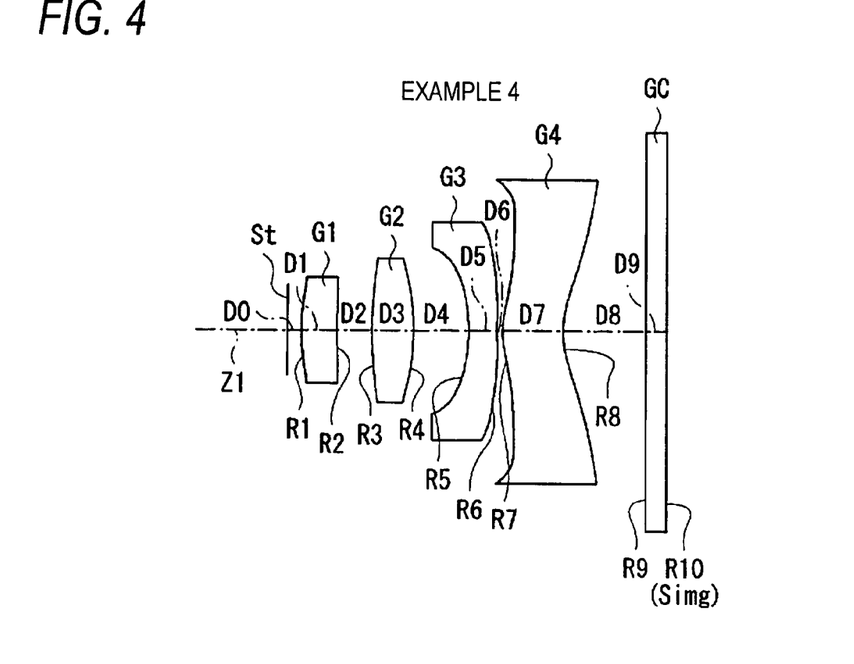
FIG. 4 is a lens section view of an imaging lens of Example 4 according to an exemplary embodiment of the invention.
Figure 5:
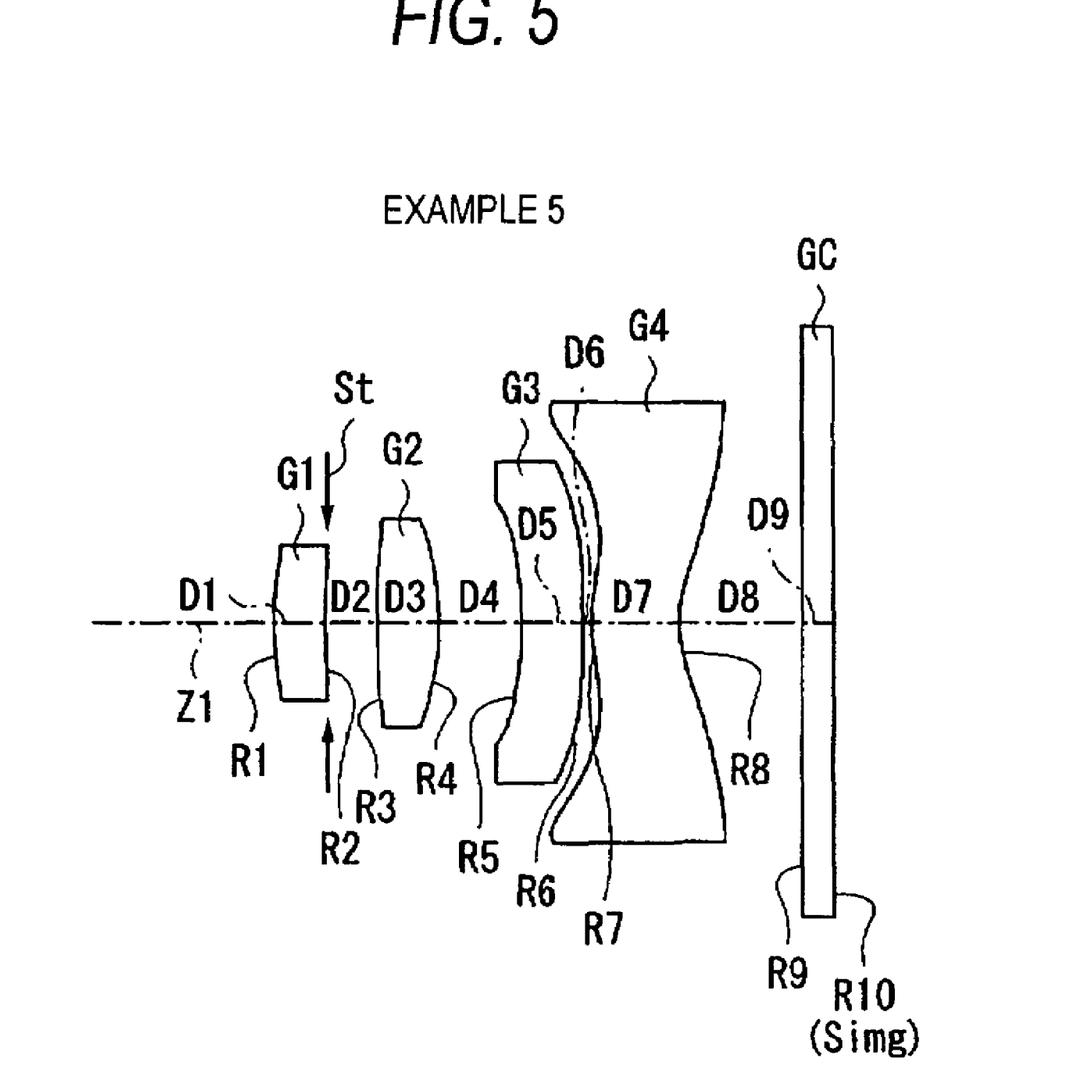
FIG. 5 is a lens section view of an imaging lens of Example 5 according to an exemplary embodiment of the invention.

FIG. 1 shows a first configuration example of an imaging lens of an exemplary embodiment of the invention. The configuration example corresponds to the lens configuration of a first numerical example (FIGS. 6A and 6B) which will be described later. FIG. 2 shows a second configuration example corresponding to the lens configuration of a second numerical example (FIGS. 7A and 7B) which will be described later. FIG. 3 shows a third configuration example corresponding to the lens configuration of a third numerical example (FIGS. 8A and 8B) which will be described later. FIG. 4 shows a fourth configuration example corresponding to the lens configuration of a fourth numerical example (FIGS. 9A and 9B) which will be described later. FIG. 5 shows a fifth configuration example corresponding to the lens configuration of a fifth numerical example (FIGS. 10A and 10B) which will be described later. In FIGS. 1 to 5, the reference character Ri indicates the radius of curvature of an i-th surface which is numbered in such a manner that the surface of a component that is closest to the object side is set as the first surface, and the number is more sequentially increased as further advancing toward the image side (imaging side). The reference character Di indicates the surface separation on the optical axis Z1 between i-th and (i+1)-th surfaces. The configuration examples have the same basic configuration.

The imaging lens can be used in an imaging apparatus using an imaging device such as a CCD or a CMOS, a digital still camera, a camera-equipped portable telephone, or a personal digital assistance. The imaging lens comprises a first lens G1, a second lens G2, a third lens G3, and a fourth lens G4, along the optical axis Z1 and sequentially from the object side. The second lens G2 is a spherical glass lens which can be subjected to the polishing process. The first, third, and fourth lenses G1, G3, G4 are, for example, aspherical plastic lenses.

An optical aperture stop St can be placed as close as possible to the object side in order to ensure the telecentricity. In the configuration examples of FIGS. 1, 2, and 5, the aperture stop St is placed in rear of the first lens G1. More specifically, in the configuration examples of FIGS. 1 and 2, the aperture stop St is positioned on the optical axis Z1 and on the apex of the rear surface of the first lens G1. In the configuration example of FIG. 5, the aperture stop St is positioned at a position which is closest to the image side in the effective diameter of the rear surface of the first lens G1. In the configuration examples of FIGS. 3 and 4, the aperture stop St is placed in front of the first lens G1 and at a position of the lens system which is closest to the object side.

An imaging device such as a CCD is placed in the imaging surface Simg of the imaging lens. In accordance with the configuration of a camera to which the lens is to be attached, various optical components GC can be placed between the fourth lens G4 and the imaging device. For example, planar optical components such as a cover glass for protecting the imaging surface, and an infrared cut filter are placed. In the configuration examples of FIGS. 1 to 5, the image-side surface of the optical component GC is made coincident with the imaging surface.

The first lens G1 has a positive refractive power in the vicinity of the optical axis. The first lens G1 has a positive meniscus shape where a convex surface is directed to, for example, the object side in the vicinity of the optical axis. In the first lens G1, the object-side surface can be an aspherical surface in which the shape in the vicinity of the optical axis is convex directed to the object side and the positive refractive power can be weaker as further advancing toward the periphery, and the image-side surface is an aspherical surface in which the shape in the vicinity of the optical axis is concave directed to the image side and the negative refractive power is weaker as further advancing toward the periphery. Alternatively, the image-side surface may be an aspherical surface in which the shape in the vicinity of the optical axis is concave directed to the image side, the negative refractive power is weaker as further advancing toward the periphery, and the positive refractive power is more obtained as further advancing toward the periphery.

The second lens G2 is a positive spherical lens in which the image-side surface has a convex shape, and satisfies the following conditional expression:

$$0.8 < f2/f < 2.0 \tag{1}$$

wherein f is the focal length of the whole system, and f2 is the focal length of the second lens G2. The second lens G2 can be a bi-convex lens in order to have a relatively large power.

The third lens G3 has a concave surface on the object side in the vicinity of the optical axis, and the third lens has a negative refractive power. The third lens G3 can have a bi-concave shape in the vicinity of the optical axis, and a peripheral portion has a meniscus shape.

The fourth lens G4 has a positive refractive power, and the shape in the vicinity of the optical axis is a meniscus shape where a convex surface is directed to the object side. The fourth lens G4 is a lens placed at a position which is closest to the imaging surface. In the fourth lens G4, therefore, the light flux is separated for each field angle as compared with the first to third lenses G1 to G3. When an aspherical surface is adequately used in the fourth lens G4, therefore, aberration correction for each field angle can be easily performed, and curvature of filed and distortion aberration can be readily corrected. Moreover, the telecentricity can be easily ensured. Consequently, it is preferable that the object-side surface of the fourth lens G4 is set to have, for example, a convex shape in the vicinity of the optical axis and a concave shape in the peripheral portion. Moreover, it is preferable that the image-side surface is set to have, for example, a concave shape in the vicinity of the optical axis and a convex shape in the peripheral portion.

The imaging lens may satisfy the following conditional expressions:

$$1.2 < f1/f < 2.5 \tag{2}$$

$$0.45 < |f3/f| < 0.8 \tag{3}$$

$$0.8 < f4/f < 1.5 \tag{4}$$

wherein f is the focal length of the whole system, f1 is the focal length of the first lens G1, f3 is the focal length of the third lens G3, and f4 is the focal length of the fourth lens G4.

The fourth lens G4 may satisfy the following conditional expression:

$$0.20 < R4A/f < 0.35 \tag{5}$$

wherein R4A is the paraxial radius of curvature of the object-side surface of the fourth lens G4.

The imaging lens may further satisfy the following conditional expression:

$$12 < v2 - v3 \tag{6}$$

wherein v2 is the Abbe number of the second lens G2, and v3 is the Abbe number of the third lens G3.

Next, the function and effects of the thus configured imaging lens will be described.

In the imaging lens, the shapes and refractive powers of the lenses can be adequately set by the lens configuration in which a relatively small number of lenses, four lenses, are used as a whole, and hence miniaturization and high performance can be realized. Furthermore, the second lens G2 is provided with a relatively large power, and configured by a spherical glass lens which can be subjected to the polishing process. Therefore, the temperature characteristics can be advantageously set while suppressing the cost. In the imaging lens, the second lens G2 having a power is a spherical lens, and the other lenses are aspherical lenses for aberration correction, whereby aberration can be satisfactorily corrected. Particularly, conditional expression (1) is satisfied so that the focal length f2 of the second lens G2 is substantially equal to or similar to the focal length f of the whole system. Even when the other lenses are aspherical plastic lenses, therefore, the positive and negative refractive powers of the lenses are cancelled each other, and a performance which is advantageous to the temperature characteristics can be obtained.

Conditional expressions (1) to (4) relate to the focal lengths of the lenses. When the focal lengths are deviated from the numerical ranges, the power balance among the lenses is lost, and miniaturization and high performance are difficult to be simultaneously attained. When these conditions are satisfied, the power balance among the lenses is optimized while attaining a configuration which is advantageous to the temperature characteristics, and hence miniaturization and high performance can be readily realized.

Conditional expression (5) relates to the radius of curvature of the object-side surface of the fourth lens G4. When, while setting the third lens G3 to have a bi-concave shape in the vicinity of the optical axis, conditional expression (5) is satisfied to optimize the shape of the fourth lens G4, it is advantageous to correction of various aberrations, and the back focus which is required for placing a cover glass and the like can be easily ensured. When the radius of curvature is deviated from the numerical range of conditional expression (5), they are hardly realized.

Conditional expression (6) relates to the Abbe numbers of the second and third lenses G2 and G3. When the Abbe numbers are lower than the numerical range, sufficient correction of chromatic aberration is hardly performed, and hence this is not preferable. When conditional expression (6) is satisfied, it is advantageous to correction of chromatic aberration.

In the imaging lens, the aperture stop St is placed in front or rear of the first lens G1, and therefore a lens system which is advantageous to shortening of the whole length and ensurance of the telecentricity can be obtained. In the imaging lens, the aspherical surfaces of the surfaces are optimized, whereby further effective aberration correction is enabled. In order to cope with an imaging device having an increased pixel number, it is requested to attain the telecentricity, i.e., to make the incident angle of the principal ray to the imaging device substantially parallel to the optical axis (the incident angle in the imaging surface is substantially zero with respect to the normal line of the imaging surface). In the imaging device, for example, the image-side surface of the fourth lens G4 which is the final lens surface closest to the imaging device has a shape which is concave to the image side in the vicinity of the optical axis and convex to the image side in the peripheral portion, whereby aberration correction for each field angle is adequately performed and the incident angle of the light flux to the imaging device is controlled to a constant angle or less. According to the configuration, light quantity unevenness in the whole imaging surface can be reduced, and it is advantageous to correction of curvature of filed and distortion aberration.

As described above, according to the imaging lens of the embodiment, the lens shape and the refractive power can be adequately set by the lens configuration in which a relatively small number of lenses, four lenses, are used as a whole. Particularly, conditional expression (1) is satisfied so that the focal length f2 of the second lens G2 is substantially equal to or similar to the focal length f of the whole system. The second lens G2 is configured by a spherical glass lens. Therefore, an imaging lens system which is provided with excellent temperature characteristics, a reduced size, and high performance can be realized while the cost is suppressed.

EXAMPLES

Next, specific numerical examples of the imaging lens of the embodiment will be described. Hereinafter, first to fifth numerical examples will be collectively described.

Figure 6A:
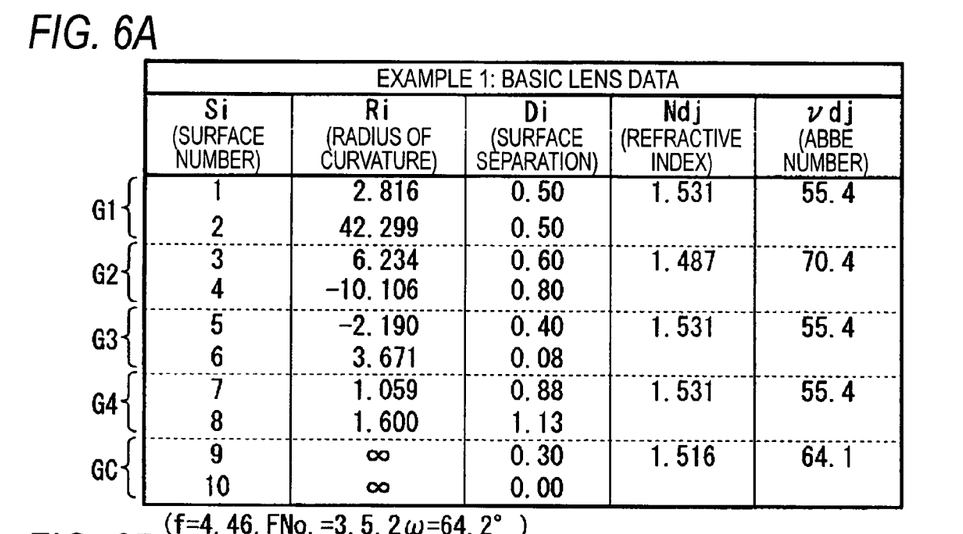
FIG. 6A is a view showing basic lens data of the imaging lens of Example 1.
Figure 6B:
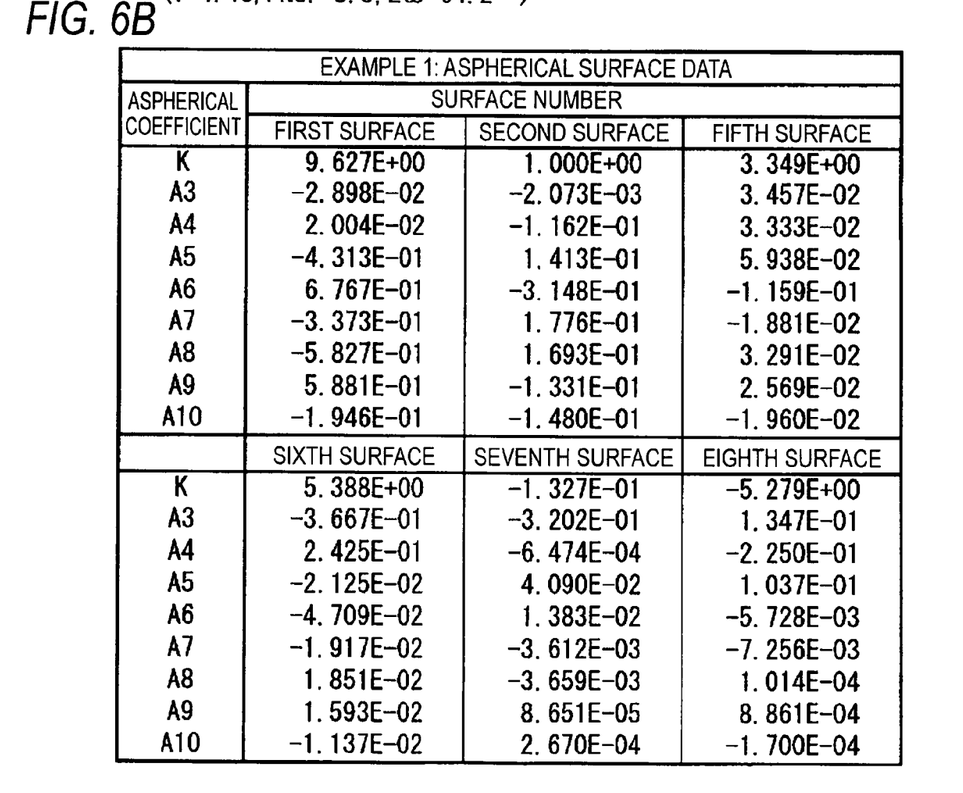
FIG. 6B is a view showing lens data relating to an aspherical surface of the imaging lens.

FIGS. 6A, 6B show specific lens data corresponding to the configuration of the imaging lens shown in FIG. 1, as Example 1. FIG. 6A shows basic lens data, and FIG. 6B shows data relating to an aspherical surface. In the column of the surface number Si in the lens data shown in FIG. 6A, the number of an i-th (i=1 to 10) surface which is numbered in such a manner that the surface of a component that is closest to the object side is set as the first surface, and the number is more sequentially increased as further advancing toward the image side is shown. In the column of the radius of curvature Ri, the value (mm) of the radius of curvature of the i-th surface counted from the object side is shown in correspondence to the reference character Ri used in FIG. 1. Also in the column of the surface separation Di, the separation (mm) on the optical axis between an i-th surface Si counted from the object side and an (i+1)-th surface Si+1 is shown. Ndj indicates the value of the refractive index with at the d-line (wavelength=587.6 nm) of a j-th (j=1 to 5) optical component counted from the object side. In the column of vdj, the value of the Abbe number of the j-th optical component counted from the object side at the d-line is shown. FIG. 6A shows also the values of the paraxial focal length f (mm) of the whole system, the F-number (F No.), and the field angle 2ω (ω=half field angle), as various data.

In the imaging lens of Example 1, all of the both surfaces of the first, third, and fourth lenses G1, G3, G4 have an aspherical shape. In the basic lens data of FIG. 6A, values of radii of curvature in the vicinity of the optical axis are shown as the radii of curvature of the aspherical surfaces. In the values indicated as the aspherical data in FIG. 6B, the symbol "E" indicates that the value following it is "power exponent" to the base 10, and the value indicated by the power exponent to the base 10 is multiplied with the value preceding "E". For example, "1.0 E-02" indicates "$1.0 \times 10^{-2}$".

As the aspherical data, the values of coefficients $A_n$ and K in an expression of an aspherical shape indicated by following expression (A) are written. More specifically, Z indicates the length (mm) of a perpendicular line which is drawn from a point on an aspherical surface existing at a position of the height h from the optical axis Z1, to a tangential plane (plane perpendicular to the optical axis Z1) of the apex of the aspherical surface. In the imaging lens of Example 1, each aspherical surface is shown by effectively using third to tenth coefficients $A_3$ to $A_{10}$ as an aspherical coefficient $A_n$.

$$Z = C \cdot h^2 / \{1 + (1 - K \cdot C^2 \cdot h^2)^{1/2}\} + \Sigma A_n \cdot h^n \quad (A)$$

(n=an integer of 3 or more)

where

Z: depth (mm) of the aspherical surface h: distance (height) (mm) from the optical axis to the lens surface K: eccentricity (second aspherical coefficient)

C: paraxial curvature=1/R (R: paraxial radius of curvature)

$A_n$: n-th aspherical coefficient.

Figure 7A:
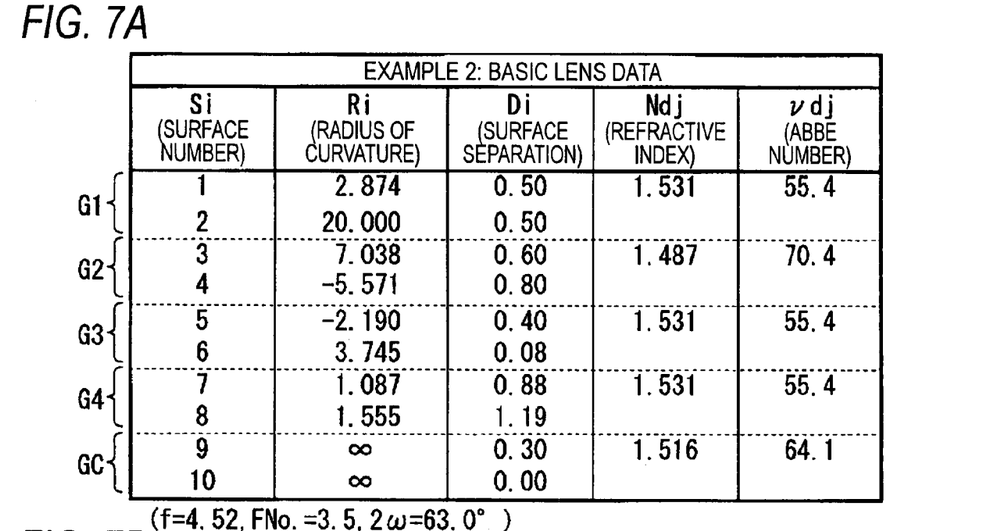
FIG. 7A is a view showing basic lens data of the imaging lens of Example 2.
Figure 7B:
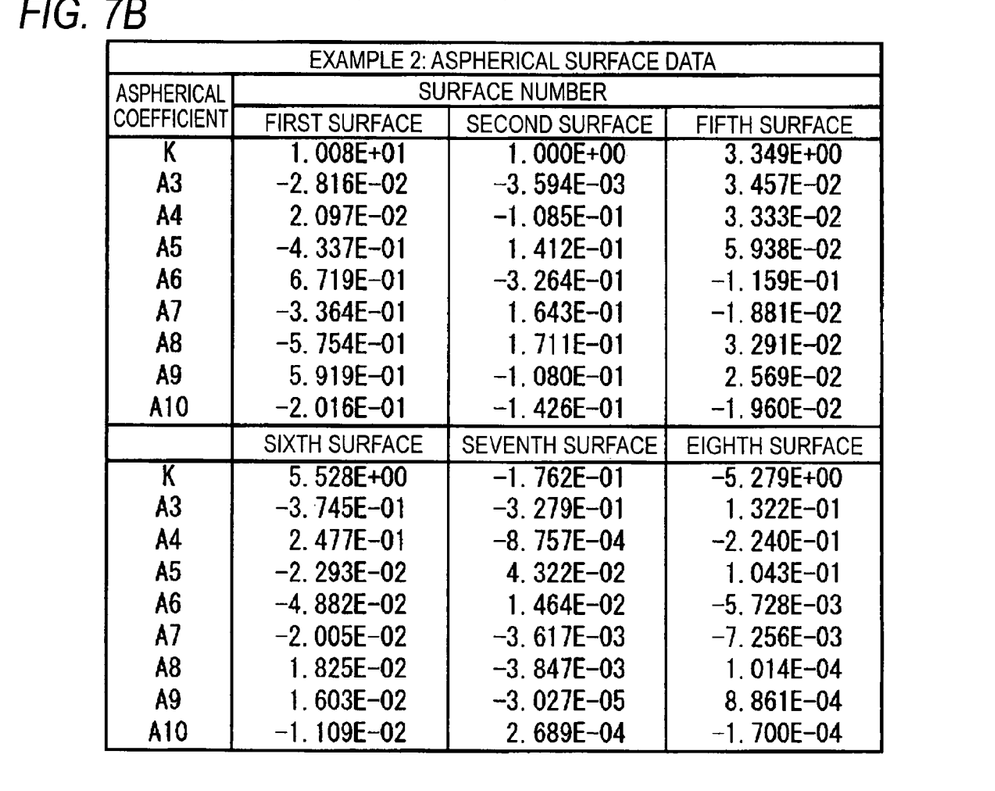
FIG. 7B is a view showing lens data relating to an aspherical surface of the imaging lens.
Figure 8A:
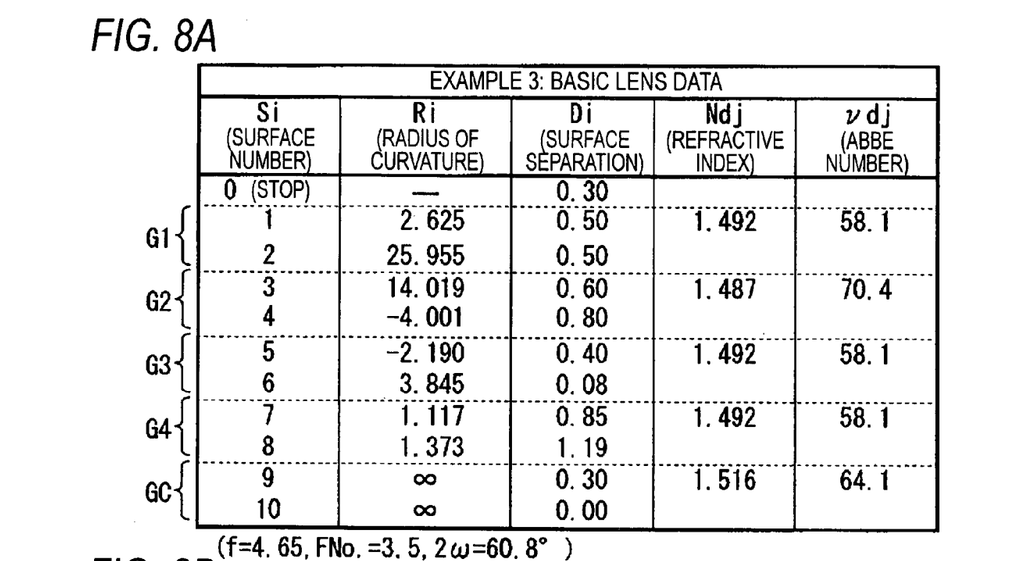
FIG. 8A is a view showing basic lens data of the imaging lens of Example 3.
Figure 8B:
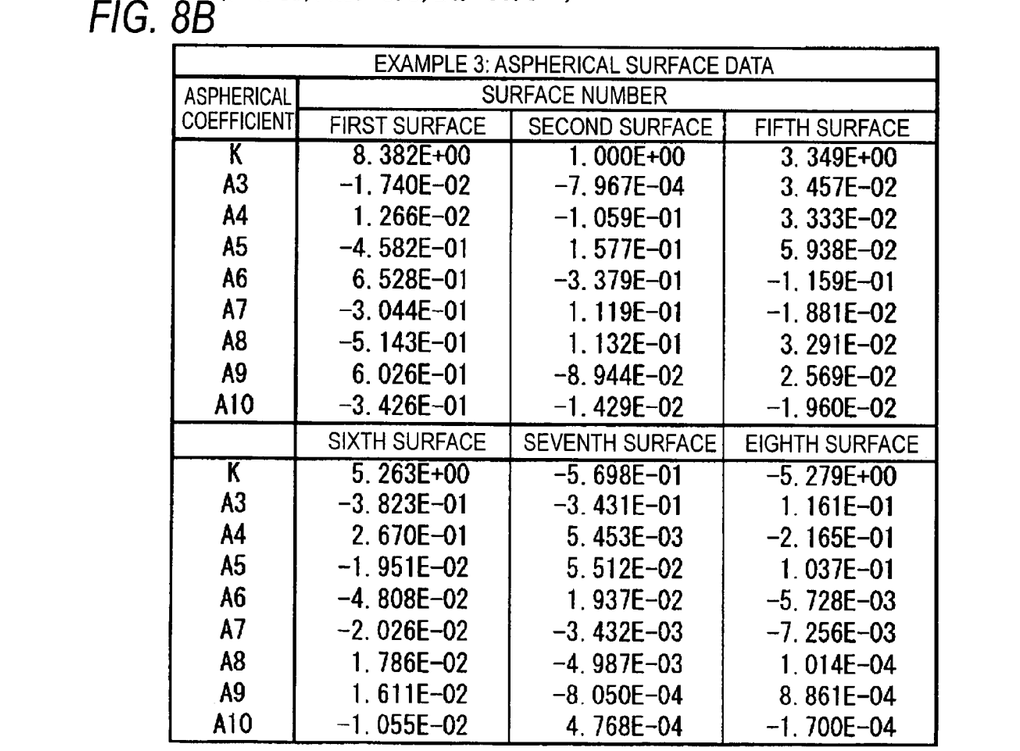
FIG. 8B is a view showing lens data relating to an aspherical surface of the imaging lens.
Figure 9A:
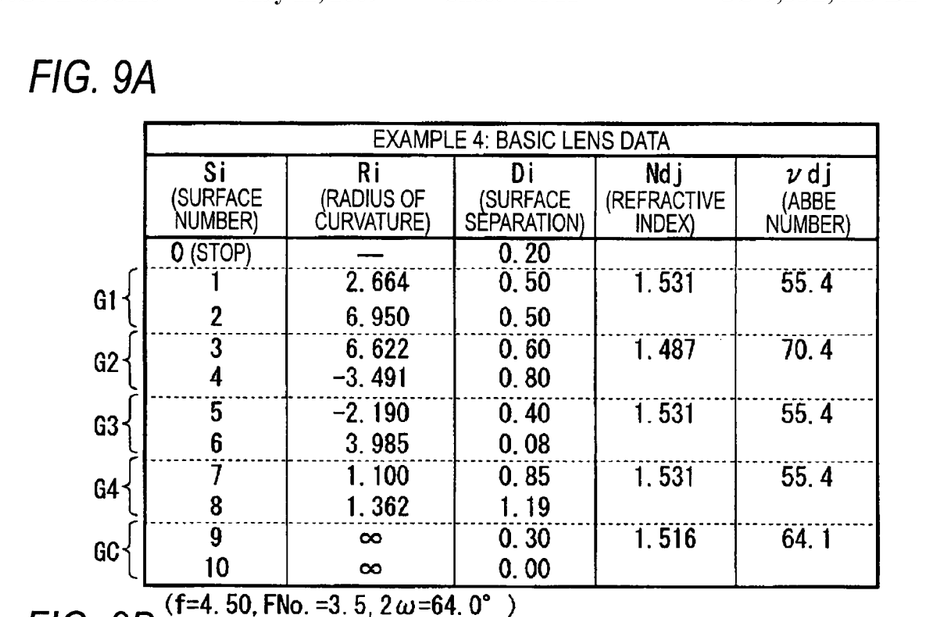
FIG. 9A is a view showing basic lens data of the imaging lens of Example 4.
Figure 9B:
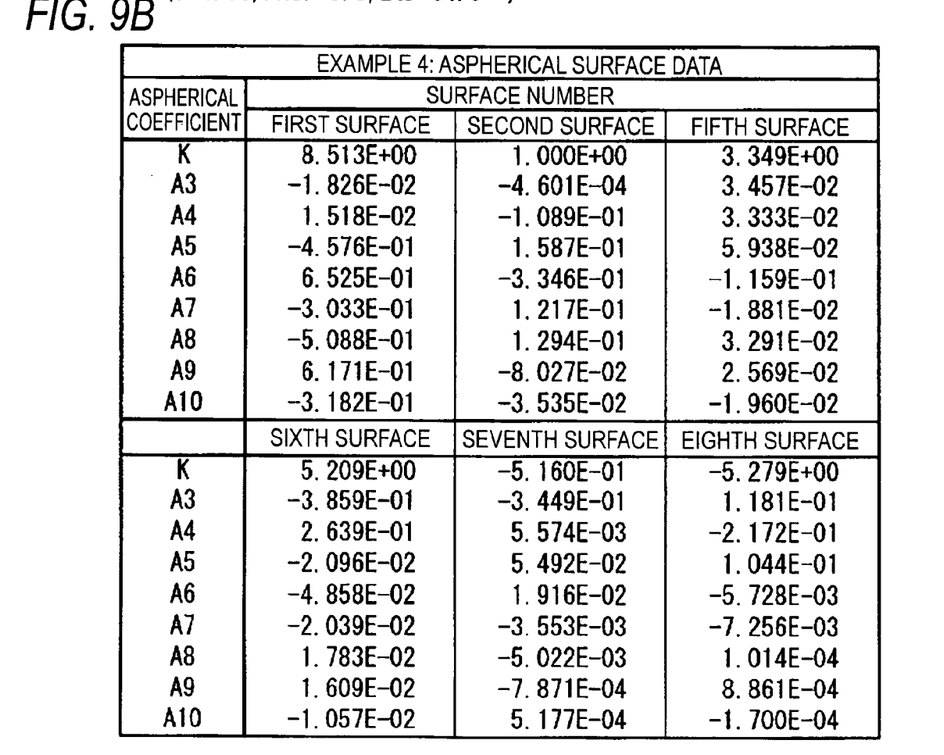
FIG. 9B is a view showing lens data relating to an aspherical surface of the imaging lens.
Figure 10A:
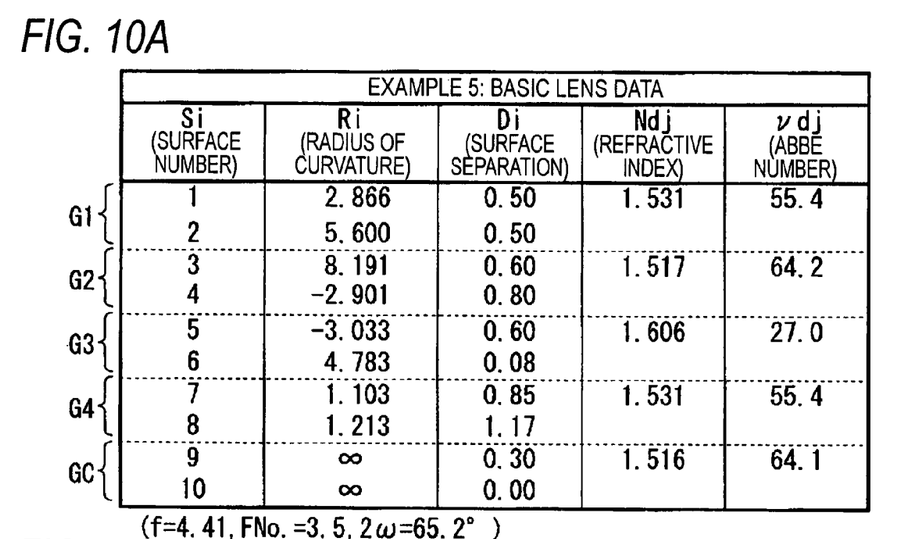
FIG. 10A is a view showing basic lens data of the imaging lens of Example 5.
Figure 10B:
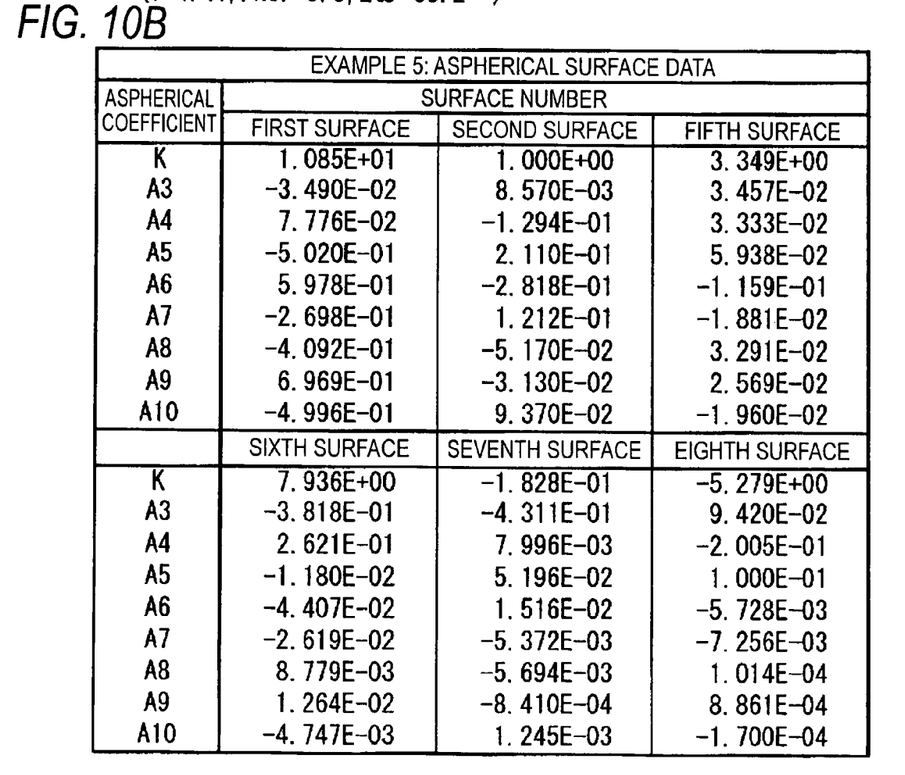
FIG. 10B is a view showing lens data relating to an aspherical surface of the imaging lens.

In the same manner as the imaging lens of Example 1, FIGS. 7A, 7B show specific lens data corresponding to the configuration of the imaging lens shown in FIG. 2, as Example 2. Similarly, FIGS. 8A, 8B show specific lens data corresponding to the configuration of the imaging lens shown in FIG. 3, as Example 3. Similarly, FIGS. 9A, 9B show specific lens data corresponding to the configuration of the imaging lens shown in FIG. 4, as Example 4. Similarly, FIGS. 10A, 10B show specific lens data corresponding to the configuration of the imaging lens shown in FIG. 5, as Example 5. In the same manner as Example 1, also in any of the imaging lenses of Examples 2 to 5, all of the both surfaces of the first, third, and fourth lenses G1, G3, G4 have an aspherical shape.

Figure 11:
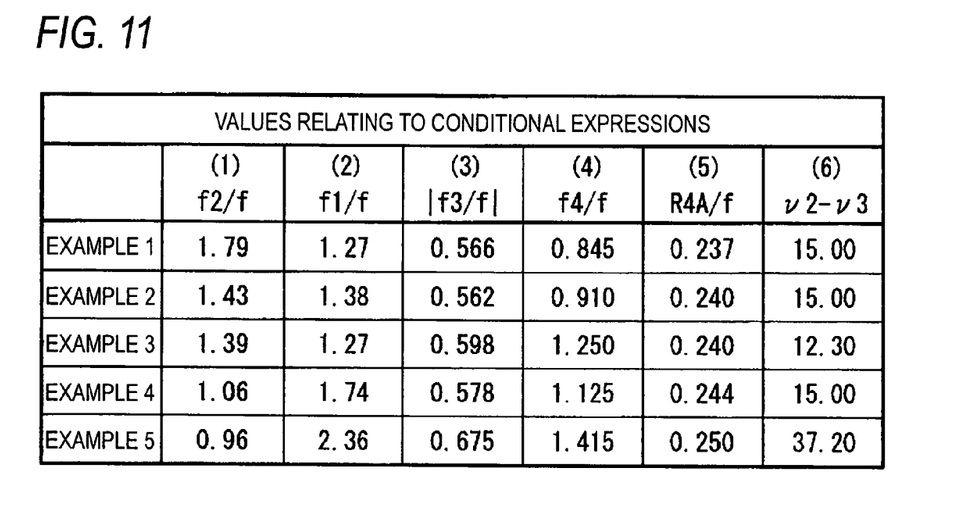
FIG. 11 is a view collectively showing values relating to conditional expressions for the examples.

FIG. 11 collectively shows values relating to the above-mentioned conditional expressions, for each of the examples. As seen from FIG. 11, the values of the examples are within the numerical ranges of the conditional expressions.

Figure 12A:
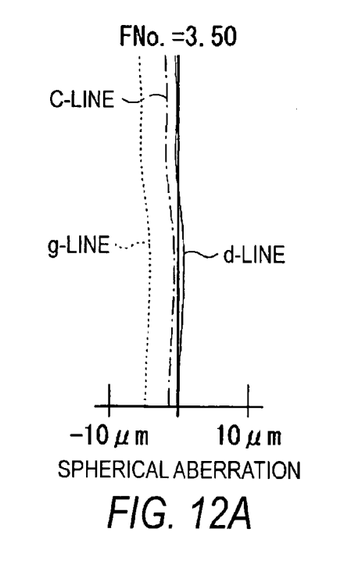
FIG. 12A is a view showing spherical aberration of the imaging lens of Example 1.
Figures 12B, 12C:
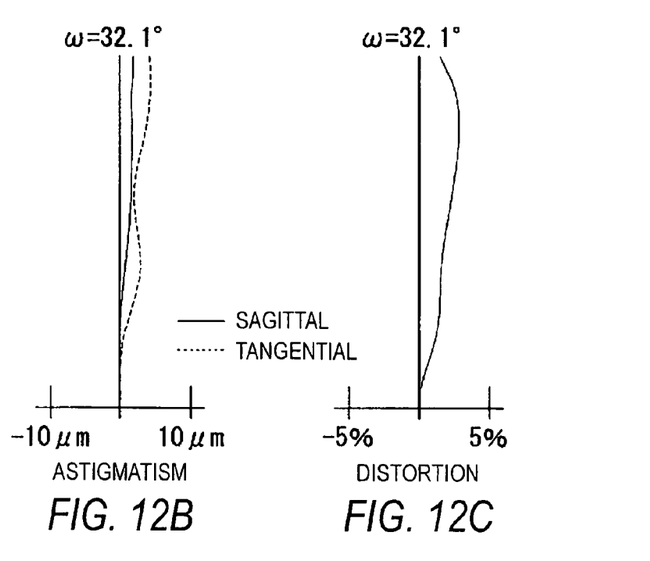
FIG. 12B is a view showing astigmatism of the imaging lens.
FIG. 12C is a view showing distortion of the imaging lens.

FIGS. 12A to 12C show the spherical aberration, astigmatism, and distortion (distortion aberration) of the imaging lens of Example 1, respectively. Each aberration diagram shows aberration in which the d-line is set as the reference wavelength. In the spherical aberration diagram, also aberrations at the g-line (wavelength=435.8 nm) and the C-line (wavelength=656.3 nm) are shown. In the astigmatism diagram, the solid line indicates the aberration in the sagittal direction, and the broken line indicates the aberration in the tangential direction. F No. indicates the F-number, and ω indicates the half field angle.

Figure 13A:
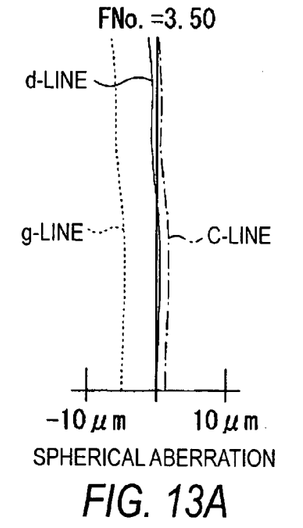
FIG. 13A is a view showing spherical aberration of the imaging lens of Example 2.
Figures 13B, 13C:
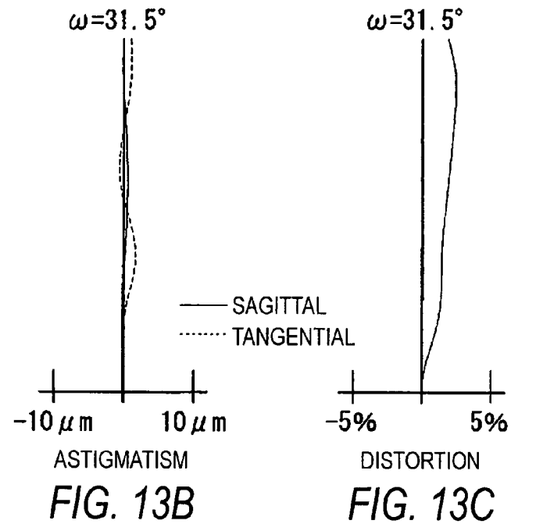
FIG. 13B is a view showing astigmatism of the imaging lens.
FIG. 13C is a view showing distortion of the imaging lens.
Figure 14A:
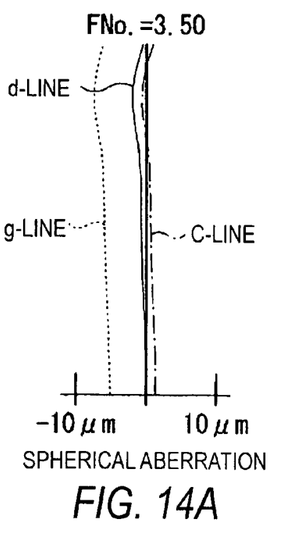
FIG. 14A is a view showing spherical aberration of the imaging lens of Example 3.
Figures 14B, 14C:
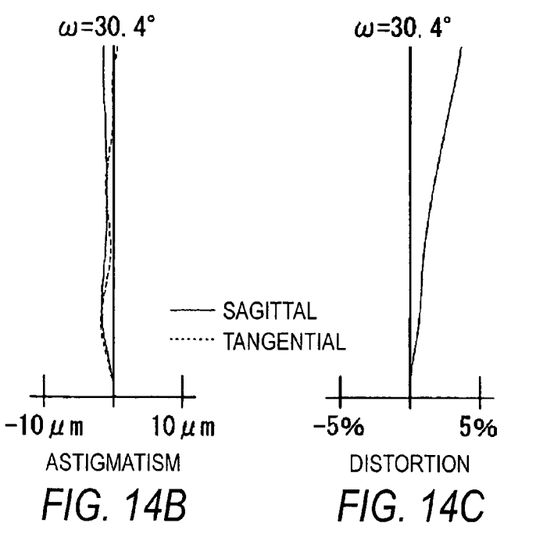
FIG. 14B is a view showing astigmatism of the imaging lens.
FIG. 14C is a view showing distortion of the imaging lens.
Figure 15A:
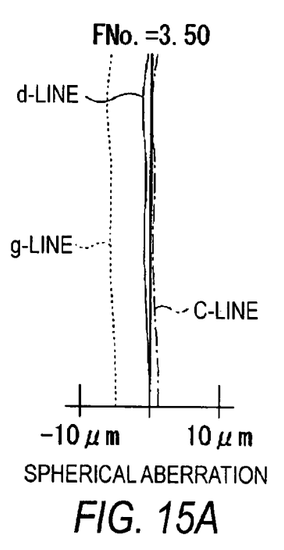
FIG. 15A is a view showing spherical aberration of the imaging lens of Example 4.
Figures 15B, 15C:
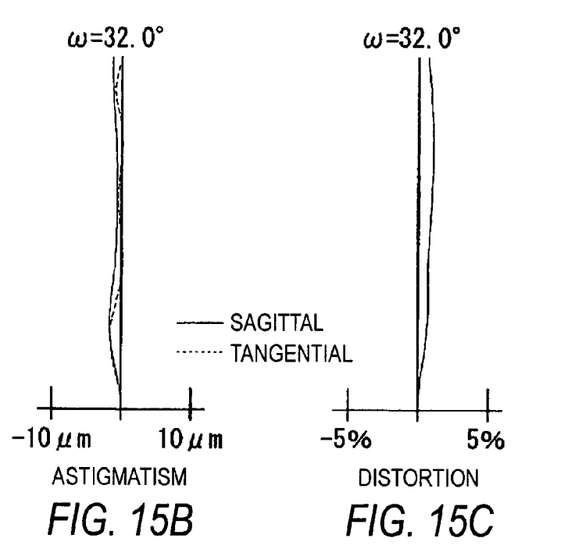
FIG. 15B is a view showing astigmatism of the imaging lens.
FIG. 15C is a view showing distortion of the imaging lens.
Figure 16A:
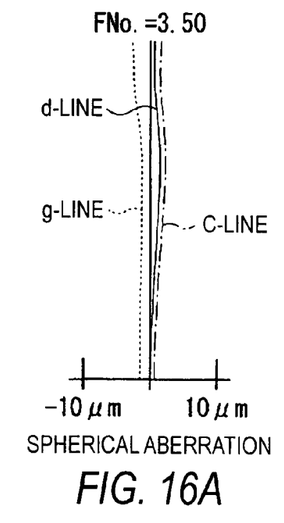
FIG. 16A is a view showing spherical aberration of the imaging lens of Example 5.
Figures 16B, 16C:
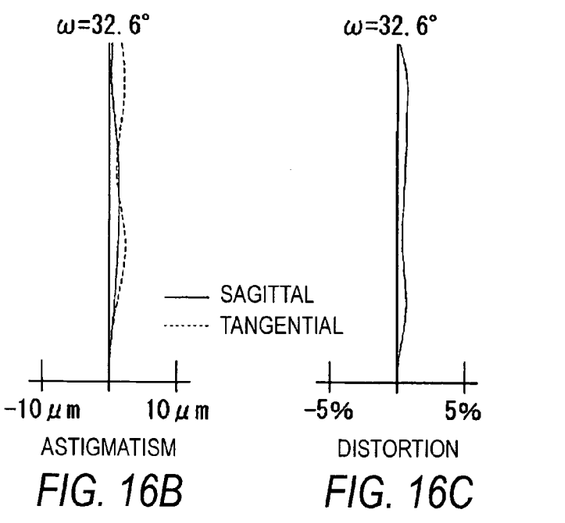
FIG. 16B is a view showing astigmatism of the imaging.
FIG. 16C is a view showing distortion of the imaging lens.

Similarly, FIGS. 13A to 13C show the aberrations of the imaging lens of Example 2, FIGS. 14A to 14C show the aberrations of the imaging lens of Example 3, FIGS. 15A to 15C show the aberrations of the imaging lens of Example 4, and FIGS. 16A to 16C show the aberrations of the imaging lens of Example 5.

As seen from the numeral data and the aberration diagrams, all the examples can realize an imaging lens system in which the four-lens configuration is formed as a whole, the second lens G2 is configured by a spherical glass lens, a configuration which is provided with excellent temperature characteristics while suppressing the cost is attained, the surface shapes and power distribution of the lens are optimized, the size is reduced, and high performance is attained.

The invention is not restricted to the embodiment and the examples, and various modifications are enabled. For example, the radius of curvature, the surface separation, and the refractive index of each lens component, and the like are not limited to the values of the numerical examples, and may have other values.

This application claims foreign priority from Japanese Patent Application No. 2006-239808, filed Sep. 5, 2006, the entire disclosure of which is herein incorporated by reference.

What is claimed is:

1. An imaging lens comprising: in order from an object side of the imaging lens,
   a first lens having a positive refractive power;
   a second lens having a positive refractive power and being a spherical glass lens having a convex surface on an image side thereof;
   a third lens having a negative refractive power and having a concave surface on the object side in the vicinity of an optical axis thereof; and
   a fourth lens having a positive refractive power and having a meniscus shape in the vicinity of the optical axis thereof, a convex surface in the meniscus shape being directed to the object side,
   the imaging lens satisfying conditional expression:

$$0.8 < f2/f < 2.0 \quad (1)$$

wherein
   f is a focal length of the imaging lens, and
   f2 is a focal length of the second lens.

2. The imaging lens according to claim 1, wherein the imaging lens further satisfies conditional expressions:

$$1.2 < f1/f < 2.5 \quad (2)$$

$$0.45 < |f3/f| < 0.8 \quad (3)$$

$$0.8 < f4/f < 1.5 \quad (4)$$

wherein
   f is a focal length of the imaging lens,
   f1 is a focal length of the first lens,
   f3 is a focal length of the third lens, and
   f4 is a focal length of the fourth lens.

3. The imaging lens according to claim 1, wherein
   an object-side surface of the first lens is an aspherical surface in which a shape in the vicinity of the optical axis is convex directed to the object side and a positive refractive power becomes weaker as advancing toward a periphery of the first lens, and
   an image-side surface of the first lens is an aspherical surface in which a shape in the vicinity of the optical axis is concave directed to the image side and a negative refractive power becomes weaker as advancing toward the periphery of the first lens.

4. The imaging lens according to claim 1, wherein the third lens has a bi-concave shape in the vicinity of the optical axis, and
   the fourth lens satisfies conditional expression:

$$0.20 < R4A/f < 0.35 \quad (5)$$

wherein
   f is a focal length of the imaging lens, and
   R4A is a paraxial radius of curvature of an object-side surface of the fourth lens.

5. The imaging lens according to claim 1, further satisfying conditional expression:

$$12 < v2 - v3 \quad (6)$$

wherein
   v2 is an Abbe number of the second lens, and
   v3 is an Abbe number of the third lens.

6. The imaging lens according to claim 2, wherein
   an object-side surface of the first lens is an aspherical surface in which a shape in the vicinity of the optical axis is convex directed to the object side and a positive refractive power becomes weaker as advancing toward a periphery of the first lens, and
   an image-side surface of the first lens is an aspherical surface in which a shape in the vicinity of the optical axis is concave directed to the image side and a negative refractive power becomes weaker as advancing toward the periphery of the first lens.

7. The imaging lens according to claim 2, wherein the third lens has a bi-concave shape in the vicinity of the optical axis, and
   the fourth lens satisfies conditional expression:

$$0.20 < R4A/f < 0.35 \quad (5)$$

wherein
   f is a focal length of the imaging lens, and
   R4A is a paraxial radius of curvature of an object-side surface of the fourth lens.

8. The imaging lens according to claim 3, wherein the third lens has a bi-concave shape in the vicinity of the optical axis, and
   the fourth lens satisfies conditional expression:

$$0.20 < R4A/f < 0.35 \quad (5)$$

wherein
   f is a focal length of the imaging lens, and
   R4A is a paraxial radius of curvature of an object-side surface of the fourth lens.

9. The imaging lens according to claim 6, wherein the third lens has a bi-concave shape in the vicinity of the optical axis, and
   the fourth lens satisfies conditional expression:

$$0.20 < R4A/f < 0.35 \quad (5)$$

wherein
   f is a focal length of the imaging lens, and
   R4A is a paraxial radius of curvature of an object-side surface of the fourth lens.

10. The imaging lens according to claim 2, further satisfying conditional expression:

$$12 < v2 - v3 \quad (6)$$

wherein
    v2 is an Abbe number of the second lens, and
    v3 is an Abbe number of the third lens.

11. The imaging lens according to claim 3, further satisfying conditional expression:

$$12 < v2 - v3 \quad (6)$$

wherein
    v2 is an Abbe number of the second lens, and
    v3 is an Abbe number of the third lens.

12. The imaging lens according to claim 4, further satisfying conditional expression:

$$12 < v2 - v3 \quad (6)$$

wherein
    v2 is an Abbe number of the second lens, and
    v3 is an Abbe number of the third lens.

13. The imaging lens according to claim 6, further satisfying conditional expression:

$$12 < v2 - v3 \tag{6}$$

wherein
v2 is an Abbe number of the second lens, and
v3 is an Abbe number of the third lens.

14. The imaging lens according to claim 7, further satisfying conditional expression:

$$12 < v2 - v3 \tag{6}$$

wherein
v2 is an Abbe number of the second lens, and
v3 is an Abbe number of the third lens.

15. The imaging lens according to claim 8, further satisfying conditional expression:

$$12 < v2 - v3 \tag{6}$$

wherein
v2 is an Abbe number of the second lens, and
v3 is an Abbe number of the third lens.

16. The imaging lens according to claim 9, further satisfying conditional expression:

$$12 < v2 - v3 \tag{6}$$

wherein
v2 is an Abbe number of the second lens, and
v3 is an Abbe number of the third lens.

* * * * *